United States Patent Office 3,754,077
Patented Aug. 21, 1973

3,754,077
PROCESS OF OBTAINING SILICON
TETRAHALIDES
Manfred Kruger, Grossauheim, and Eugen Meyer-Simon, Frankfurt am Main, Germany, assignors to Deutsche Gold- und Silber-Scheideanstalt vormals Roessler, Frankfurt am Main, Germany
No Drawing. Continuation-in-part of abandoned application Ser. No. 810,929, May 25, 1969. This application Mar. 2, 1972, Ser. No. 231,373
Claims priority, application Germany, Mar. 28, 1968, P 17 67 078.9
Int. Cl. C01b 33/08
U.S. Cl. 423—341
7 Claims

ABSTRACT OF THE DISCLOSURE

Silicon tetrahalides are made or the contents thereof in silane mixtures is increased by passing a halogenosilane or a mixture of halogenosilanes of the formula $$H_nSiX_{4-n}$$

wherein X is halogen and if several X are present all of them may be the same or different, and $n$ is 1–3, together with a hydrogen halide through a bed of inert solid particulate large-surface catalyst selected from the group of activated carbon, finely divided aluminum oxide and finely divided silicon dioxide, the reaction being carried out at a temperature between 200 and 800° C.

CROSS-REFERENCE TO RELATED APPLICATION

This application is a continuation-in-part of the application filed by the same inventors in respect to "A Process of Making Halogenosilanes" on May 25, 1969 as Ser. No. 810,929, which is abandoned.

BACKGROUND OF THE INVENTION

The invention relates to a process for making halogenosilanes which do not have SiH bonds, and the general formula of which is $SiX_4$ in which X stands for halogen.

Halogenosilanes, particularly silicon tetrahalide, are produced on a large scale in industry and have found many uses. Technically particularly important are silicon tetrachloride and silicon tetrafluoride which are used on a large scale for making, for instance, pure finely divided silicon dioxide and elemental silicon.

Silicon tetrachloride is produced for instance by direct synthesis wherein chlorine is reacted with silicon or silicon-containing materials. Chlorosilanes can also be formed by reaction of hydrogen chloride with silicon or silicon-containing materials such as ferrosilicon. The main reaction in these cases is as follows:

$$Si + 4HCl = SiCl_4 + 2H_2 \quad (1)$$

Along with this reaction there are also reactions of the following two types:

$$Si + 3HCl = HSiCl_3 + H_2 \quad (2)$$

$$Si + 2HCl = H_2SiCl_2 \quad (3)$$

Accordingly, what is obtained are usually mixtures which in addition to silicon tetrachloride contain chlorosilanes with SiH bonds. The reaction between silicon and hydrogen chloride, for instance, starts already at a temperature of about 300° C. and results in a chlorosilane mixture with trichlorosilane and silicon tetrachloride as the main components. With increasing temperature a shift of the ratio of the reaction products $SiCl_4:HSiCl_3$, towards $SiCl_4$ occurs. However, even at a temperature as high as 700° there are still obtained about 10–30% by weight of $HSiCl_3$, if there is an excess of silicon in the reaction chamber. A still further temperature increase in the case of adiabatic operation of the reaction furnace effects only a minor shift of the ratio of $SiCl_4:HSiCl_3$ towards $SiCl_4$. The temperature increase only favors the side-reactions and the thermal decomposition of the chlorosilanes.

Even an increase of the input of hydrogen chloride into the reaction chamber in which silicon is present in a large excess results under these conditions only in an increased turn-over, but not in a shift of the $SiCl_4:HSiCl_3$ ratio in the final reaction product in favor of $SiCl_4$.

The reaction mixture obtained in this type of synthesis therefore must be further processed, for instance by a fractionating distillation, in order to obtain pure silicon tetrachloride. With substantial amounts of halogenosilanes in the mixture, this poses difficulties for the distillation technique, since the boiling points of the individual reaction products are closely adjacent and usually a high degree of purity is required.

It is therefore an object of the present invention to provide for a process of making halogenosilanes without SiH bonds, that is products of the formula $SiX_4$ wherein X is halogen, in which process a definite increase of the conversion of halogenosilanes with SiH bonds to silanes without SiH bonds can be accomplished and where under specific conditions an almost complete conversion is possible.

Another object of the invention is to substantially eliminate the dichlorosilane, if such is present in the reaction mixture, since this product is highly undesirable for the further use of the compounds.

SUMMARY OF THE INVENTION

Silicon tetrahalides are made according to the invention from a halogenosilane or mixture of such silanes or the silicon tetrahalide contents present initially as a mixture with one or more halogenosilane is increased by passing a halogenosilane or a mixture of such silanes of the formula $H_nSiX_{4-n}$ wherein X is halogen and if several X are present they may be the same or different, and $n$ is 1 to 3, together with a hydrogen halide through a bed of inert solid particulate large-surface catalyst which is activated carbon, finely divided aluminum oxide, or finely divided silicon dioxide. The reaction is carried out at a temperature between 200 and 800° C.

DESCRIPTION OF THE PREFERRED EMBODIMENTS

Preferably, the invention is carried out at a temperature between 300 and 700° C. at a relatively short residence time. It can be carried out also in the presence of hydrogen.

The main reaction in this case develops according to the following equation:

$$H_nSiX_{4-n} + nHX = SiX_4 + nH_2 \quad (4)$$

It is noted that there may be different halogens in the same molecule. It should also be understood that this is only the main reaction. In industrial production it will usually not occur quantitatively. However, by an adjustment of the conditions the production of the less desirable silanes, which still contain SiH bonds, can be substantially reduced. If the amount of such silanes is unduly high for a specific purpose, and in particular if pure silicon tetrachloride is wanted and is not obtained in the main reaction, the silanes can be condensed from the hydrogen-containing reaction mixture, and the low boiling fractions of for instance $HSiCl_3$ and possibly traces of $H_2SiCl_2$ may be removed by distillation, leaving a pure or substantially pure $SiCl_4$ as the bottom product.

The process is particularly useful in connection with the above-mentioned reaction of silicon with hydrogen chloride. In this process a mixture is obtained of $$SiSl_4 + HSiCl_3 + H_2SiCl_2 + H_2.$$

This mixture can then be further processed accordinng to the present invention in order to remove the chlorosilanes with SiH bonds, that is in this case the $HSiCl_3$ and $H_2SiCl_2$. A mixture for this purpose is passed through a reaction chamber which is filled with the large-surface catalyst. In this reaction chamber the main reaction will then take place according to the above Equation 4 by reacting the equimolar amount of HCl gas with the silanes, resulting, in a more or less complete conversion to $SiCl_4$ and $H_2$. It is also possible for instance to react a chlorosilane with hydrogen chloride on a catalyst wherein the chlorosilane mixture is separated by condensation from hydrogen.

A particular advantage of the process of the invention is that it is useful for chlorosilane mixtures in which a comparatively large amount of dichlorosilane is present, even though these mixtures may otherwise substantially contain no other component than trichlorosilane. The reaction mixture in this case can be reacted with an equimolar amount of HCl gas, which is just sufficient for converting the dichlorosilane to $SiCl_4$ and $H_2$. This conversion occurs almost quantitatively, while on the other hand substantially no $HSiCl_3$ will react with the hydrogen chloride in the manner indicated by Equation 4.

The dichlorosilane is quite undesirable, particularly in admixture with trichlorosilane, because of the specific properties of dichlorosilane which are high impact sensitivity in the presence of oxidizing agents such as the oxygen of the air, etc., a sensitivity to humidity which even surpasses that of trichlorosilane, and high vapor-pressure at room temperature.

The large-surface materials which have a high catalytic activity are activated carbon, finely divided aluminum oxide, finely divided silicon oxide and the like.

The reaction can be carried out at a reduced or elevated pressure, but preferably it is effected at atmospheric pressure.

The following examples will further illustrate the invention.

EXAMPLE 1

The apparatus used in this case was first thoroughly rinsed with dry nitrogen. A mixture of hydrogen, dichlorosilane, trichlorosilane and silicon tetrachloride, together with one liter hydrogen chloride per hour, was then passed into a bed of dry oxygen-free granulated activated coal "Supersorbon WS4" of DEGUSSA, 2–4 mm. in diameter, specific surface area about 4250 m.²/g., provided in a quartz tube of 30 cm. length and 3 cm. diameter. The amount of activated carbon was 106 g. and the carbon had been heated to a temperature of 500° C. The gaseous mixture of hydrogen, dichlorosilane, trichlorosilane and silicon tetrachloride was the result of the reaction of silicon with hydrogen chloride at 700° C. The chlorosilanes in this reaction had been present in a molar ratio of $H_2SiCl_2:HSiCl_3:SiCl_2 = <0.1:18.7:81.3$. The ratio of $H_2$ to the total amount of chlorosilanes were between 1.5:1 and 2:1. This mixture in gaseous form was passed through the catalyst bed at a speed which corresponded to about 1 liter of $HSiCl_3$ per hour. This velocity was determined by means of a rotameter on the basis of the gas-chromatographically determined contents of trichlorosilane present in the mixture.

During the initial 2–3 hours, the treatment mainly had the purpose of causing the adsorption of the components by the activated carbon, causing activation of the carbon and adjustment of the stationary-equilibrium. In continued operation there was obtained then at the outlet of the reaction chamber, a product in which the mole relation of the chlorosilanes was $$H_2SiCl_2:HSiCl_3:SiCl_4 = \ll 0.1:2.7:97.3.[1]$$

This corresponded to a continuing $HSiCl_3$ conversion of 85.6% which according to the above Equation 4 is an almost quantitative yield of 16 mols of $SiCl_4$.

The $HSiCl_3$ yield of 85.6% in this case relative to the starting amount of trichlorosilane was computed as follows:

Starting concentration: 18.7 moles
Residual concentration: 2.7 moles—i.e., 14.4%
Accordingly $HSiCl_3$ converted to $SiCl_4$: 100.0—14.4= 85.6%
Yield: 16 moles $SiCl_4$ i.e., quantitatively As can be seen, this mixture contained only a small amount of trichlorosilane, while the amount of dichlorosilane was actually below that determinable by conventional analytic methods. However, if it was desired to obtain an $SiCl_4$ of still greater purity, the chlorosilanes could be condensed from the hydrogen-containing reaction mixture at a temperature of −65° C. and the low-boiling fraction of $HSiCl_3$, including the traces of $H_2SiCl_2$, could be distilled off in a distillation column through the top of the column, while pure $SiCl_4$ could be recovered as the bottom product.

EXAMPLE 2

In this example the same method was used as in Example 1. However, the starting mixture was used in the following relationship:

$$H_2SiCl_2:HSiCl_3:SiCl_3 = 0.05:18.0:82.0$$

moles, and the volume of $H_2$ to the total sum of chlorosilane was equal to between 1.5:1 and 2:1. The catalyst bed was heated to 200° C. The final product showed a molar relationship between components as follows: $H_2SiCl_2:HSiCl_3:SiCl_4 = <0.05:14.4:85.6$.

It will be noted that in this example there is still present a substantial amount of $HSiCl_3$, while the dichlorosilane is removed except for a minute trace. This shows that at the lower limit of the temperature of the catalyst bed only a limited amount of conversion occurs. This should be compared with the other examples where, by using higher catalyst temperatures, a substantially greater conversion of the silanes to silicon tetrachloride is obtained.

EXAMPLE 3

A mixture of trichlorosilane and silicon tetrachloride in a molar relation of 12.5:87.6 was introduced as a liquid mixture into a flask at a speed of 50 ml./hour. The liquid mixture was subjected to immediate evaporation in the flask, and was then passed through a bed of activated carbon heated to 400° C., together with a current of hydrogen chloride which was introduced at a ratio of 1.5 liters per hour. The molar ratio accordingly was $HCl:HSiCl_3$=about 1.2. Otherwise, the process was the same as in Example 1. After passing through the catalyst bed and being subjected to condensation, the product had a relationship of trichlorosilane to silicon tetrachloride of 1.9:98.1 moles.

EXAMPLE 4

A liquid mixture of dichlorosilane and trichlorosilane in a molar relation of 10.8:89.2 was introduced into a flask at a speed of 50 ml./hour. In the flask it was subjected to immediate evaporation. The gas was then passed through a bed of activated coal heated to 400° C., together with a hydrogen chloride current at a speed of 2.0 liters HCl per hour. The molar relationship accordingly was $HCl:H_2SiCl_2$=about 2. Otherwise, the method was the same as in Example 1. The product obtained was subjected to condensation at −78° C. It contained di- ---
[1] The symbol "«" is intended to indicate that the amount of dichlorosilane is far below 0.1.

chlorosilane, trichlorosilane and silicon tetrachloride in a molar relation of 0.7:86.4:12.9.

This example illustrates the formation of silicon tetrachloride from a silane mixture wherein the original mixture does not contain any silicon tetrachloride at all.

In order to obtain a higher amount of silicon tetrachloride, it was only necessary to use the hydrogen chloride in an amount about 1.2 times greater than would be needed stoichiometrically to convert substantially the entire hydrogen containing chlorosilanes to silicon tetrachloride. For this purpose the hydrogen chloride was introduced at a speed of 15.0 liters/hour. This furnished the amount necessary stoichiometrically to convert substantially the entire hydrogen-containing chlorosilanes to $SiCl_4$. In this case the composition of the reaction product after condensation was at a molar ratio, as follows: $H_2SiCl_2:HSiCl_3:SiCl_4 = <0.1:8.7:91.3$. In other words based upon Equation 4 above, the conversion of the $H_2SiCl_2$ and $HSiCl_3$, respectively, was larger than 99% and 90%, respectively. Pure $SiCl_4$ could be obtained from the condensed mixture by distillative separation of the lower-boiling chlorosilanes $H_2SiCl_2$ and $HSiCl_3$.

EXAMPLE 5

A gaseous mixture of trichlorosilane and dry, bromine-free hydrogen bromide in a molar relation of $$HSiCl_3:HBr = 1:1$$

together with 0.5 l. of dry nitrogen per hour, was passed at a velocity of 10 l./hour through a bed consisting of 20 g. of dry oxygen-free granulated activated coal which had been heated to 500° C. and which was disposed in a quartz tube chamber of 20 cm. length and 1.3 cm. diameter. The hydrogen bromide used in this case had been formed from a reaction of bromine and "Tetralin" (tetrahydronaphthalene).

Regarding adsorption, activation and equilibration of the reaction, the same method was followed as in Example 1. Upon continuing operation, there were obtained, after condensation at −50° C., 68.5 g. of a product which by distillation furnished 35 g. of a colorless fraction. This fraction consisted of trichloromonobromosilane, $SiBrCl_3$. It had a boiling point of 84° C. and a weight relation as follows: silicon:chlorine:bromine = 13.0:47.4:39.0. This ratio compared with a theoretical ratio of 13.1:49.6:37.3.

Without further analysis, the foregoing will so fully reveal the gist of the present invention that others can by applying current knowledge readily adapt it for various applications without omitting features that from the standpoint of prior art fairly constitute essential features of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of making a silicon tetrahalide from a halogenosilane or a mixture of such silanes or increasing the silicon tetrahalide contents present in a mixture with one or more halogenosilanes said process comprising passing a halogenosilane or a mixture of halogenosilanes of the formula $$H_nSiX_{4-n}$$

wherein $n$ is 1 to 3 and wherein X is halogen and if several X are present all of them may be the same or different, together with a hydrogen halide, through an inert solid particulate, large-surface catalyst selected from the group consisting of activated carbon, finely divided aluminum oxide and finely divided silicon dioxide, the said reaction being carried out at a temperature between 200 and 800° C.

2. The process of claim 1, wherein any residual halogenosilanes present in the final reaction product are removed by condensation and subsequent distillation to recover the substantially pure silicon tetrahalide.

3. The process of claim 1, wherein the reaction is carried out at a temperature between 300 and 700° C.

4. The process of claim 1, wherein the reaction is carried out in the presence of hydrogen.

5. The process of claim 1, wherein dichlorosilane is present in the starting mixture and substantially all of the dichlorosilane is removed in said catalyst reaction.

6. The process of claim 5, wherein the starting mixture substantially consists of dichlorosilane and trichlorosilane and the hydrogen halide is hydrogen chloride and the amount of hydrogen chloride relative to the silanes is the amount stoichiometrically necessary to convert the dichlorosilane to silicon tetrachloride in said reaction, substantially all of the trichlorosilane being left unreacted.

7. The process of claim 1, wherein the starting material is trichlorosilane and wherein the hydrogen halide is hydrogen bromide and the product resulting from their reaction is subjected to condensation and distillation whereby trichloromonobromosilane is recovered.

References Cited

UNITED STATES PATENTS

| 2,406,605 | 8/1946 | Hurd | 423—349 |
| 2,834,648 | 5/1958 | Bailey et al. | 423—342 |
| 3,252,752 | 5/1966 | Pohl et al. | 423—342 |

OTHER REFERENCES

Schumb, W. C. et al.: JACS, 52, (1930), pp. 1464–69.
Stock, A., et al.: Berichte-Deut. Chem. Gisel. 52 (1919), pp. 695–98.
Yoshizawa et al.: Tech. Repts. Engr. Res. Inst. Kyoto, Univ. 14 (1) 1–27 (1964).

OSCAR R. VERTIZ, Primary Examiner

B. E. HEARN, Assistant Examiner